(12) United States Patent
Ito

(10) Patent No.: US 6,837,022 B2
(45) Date of Patent: Jan. 4, 2005

(54) DOUBLE GLAZED PANEL ASSEMBLY

(75) Inventor: Yoshiyasu Ito, Tochigi-ken (JP)

(73) Assignee: Yachiyo Kogyo Kabushiki Kaisha, Saitama-Ken (JP)

(*) Notice: Subject to any disclaimer, the term of this patent is extended or adjusted under 35 U.S.C. 154(b) by 84 days.

(21) Appl. No.: 10/254,555

(22) Filed: Sep. 24, 2002

(65) Prior Publication Data

US 2003/0200718 A1 Oct. 30, 2003

(30) Foreign Application Priority Data

Apr. 24, 2002 (JP) .................................... P2002-121970
Apr. 24, 2002 (JP) .................................... P2002-121971

(51) Int. Cl.⁷ .............................................. E04C 2/54
(52) U.S. Cl. ........................... 52/786.12; 52/786.13; 52/204.593; 52/716.5
(58) Field of Search ........................ 52/786.1, 786.13, 52/204.593, 200, 172, 716.5, 786.12; 428/34

(56) References Cited

U.S. PATENT DOCUMENTS

| | | | | |
|---|---|---|---|---|
| 4,394,806 A | * | 7/1983 | Day | ............................. 52/172 |
| 4,607,468 A | * | 8/1986 | Paquet | ......................... 52/172 |
| 4,669,241 A | * | 6/1987 | Kelly | ..................... 52/204.597 |
| 6,055,783 A | * | 5/2000 | Guhl et al. | ............... 52/204.62 |

FOREIGN PATENT DOCUMENTS

DE 29812574 * 7/1998 .................. 52/172
JP 06191280 A 7/1994

\* cited by examiner

Primary Examiner—Naoko Slack
(74) Attorney, Agent, or Firm—MacPherson Kwok Cher & Heid LLP; David S. Park

(57) ABSTRACT

The double glazed panel assembly comprises a glass holder frame which includes an inner annular glass supporting surface and an outer annular glass supporting surface which extends along an outer periphery of the inner annular glass supporting surface in a laterally spaced relationship and is raised relative to the inner annular glass supporting surface, and the outer and inner glass sheets are supported by the outer and inner annular glass supporting surfaces, respectively. Therefore, the outer peripheral part of the outer glass sheet provides an inwardly facing surface (facing the corresponding glass supporting surface of the glass holder frame) that is available as a surface for bonding onto the glass holder frame so that the outer glass sheet as well as the inner glass sheet can be firmly attached to the glass holder frame, and a required integrity of the assembly can be ensured even though the panel assembly presents a flush outer surface. This panel assembly is suitable for use as a sun roof panel of a motor vehicle.

12 Claims, 1 Drawing Sheet

DOUBLE GLAZED PANEL ASSEMBLY

TECHNICAL FIELD

The present invention relates to a double glazed panel assembly comprising a pair of glass sheets interposing an air or gas space therebetween, and in particular to a double glazed panel assembly suited to be constructed as a flush-surface panel assembly for motor vehicles.

BACKGROUND OF THE INVENTION

Double glazed panels are widely known in such forms as windows and doors for housings and other buildings. They may also be used as the glazing material for the windows, doors and sun roof panels of motor vehicles. A double glazed panel provides a high level of thermal insulation and prevents moisture condensation on its inner surface. The spacing between the two sheets of glass is typically maintained by spacer members interposed between the glass sheets.

The glass sheets are typically supported by a frame which is provided with flanges interposing the glass sheets between them. Therefore, the frame normally provides an adequate rigidity to the entire assembly by clamping the glass sheets from outside.

However, in the case of an automotive window assembly or slide panel assembly, there is a strong demand to provide a flush outer surface, and this prevents the use of such a frame. For instance, when a double glazed panel is applied to a flush surface slide panel assembly disclosed in Japanese patent laid open publication No. 6-191280, the frame which could provide a required rigidity can engage only the inner glass sheet, and would not be able to provide a required rigidity to the assembly. In other words, because the frame is unable to directly engage the outer glass sheet, the attachment between the double glazed panel and the frame would not be as strong as desired.

Particularly when such a double glazed panel assembly is applied to a motor vehicle, it is necessary to ensure that the panel assembly can withstand repeated changes in the ambient pressure because the motor vehicle is often required to travel from a low elevation area to a high elevation area and vice versa. The resulting changes in pressure cause repeated cycles of distortion to the glass sheets, and this may cause detrimental effects on the sealing of the space between the two glass sheets over time. Once moisture or foreign matter gets into the space, it is extremely difficult to expel it. A similar problem may be caused by repeated cycles of temperature changes.

BRIEF SUMMARY OF THE INVENTION

In view of such problems of the prior art, a primary object of the present invention is to provide a double glazed panel assembly which provides a flush outer surface while providing a high level of rigidity.

A second object of the present invention is to provide a double glazed panel assembly which can withstand extreme conditions.

A third object of the present invention is to provide a double glazed panel assembly which is suitable for use as a sun roof panel of a motor vehicle.

According to the present invention, such objects can be accomplished by providing a glass panel assembly, comprising: a glass holder frame defining an inner annular glass supporting surface and an outer annular glass supporting surface which extends along an outer periphery of the inner annular glass supporting surface in a laterally spaced relationship and is raised relative to the inner annular glass supporting surface; an inner glass sheet having a peripheral part supported by and attached to the inner annular glass supporting surface; and an outer glass sheet having a peripheral part supported by and attached to the outer annular glass supporting surface.

Thus, the outer peripheral part of the outer glass sheet provides an inwardly facing surface (facing the corresponding glass supporting surface of the glass holder frame) that is available as a surface for bonding onto the glass holder frame so that the outer glass sheet as well as the inner glass sheet can be firmly attached to the glass holder frame, and a required integrity of the assembly can be ensured. Typically, a spacer member is interposed between the glass sheets to define an air space between them.

According to a preferred embodiment of the present invention, the glass holder frame comprises a metallic frame member, and the peripheral part of at least one of the glass sheets is supported by the corresponding annular glass supporting surface via an elastomeric annular mold member insert molded onto the metallic frame member or the corresponding glass sheet. The elastomeric annular mold member provides a support for the glass sheet without creating any localized stress to the glass sheet. Also, a bonding agent may be filled in an annular space defined between the peripheral part of the at least one of the glass sheets and the corresponding annular glass supporting surface, the elastomeric annular mold member providing a peripheral dam for the bonding agent.

A channel member receiving a desiccant may extend along a peripheral part of a space defined between the glass sheets. In this case, the peripheral part of each of the glass sheets may be supported by the corresponding annular glass supporting surface via an elastomeric mold member insert molded onto the metallic frame member or the corresponding glass sheet, a bonding agent being filled in an annular space defined between the peripheral parts of the glass sheets, the channel member, the glass support frame and the mold members.

To minimize the stress that may be created due to the changes in the difference between the inner pressure of the space between the glass sheets and the ambient pressure, a resilient wall member may extend along a peripheral part of a space defined between the glass sheets, and define a substantially enclosed inner chamber separated from the space and communicating with the atmosphere. Any increase or decrease in the pressure difference is compensated for by the deflection of the resilient wall. The resilient wall may be provided in a bottom region of the channel member for receiving a desiccant.

The glazing material typically consists of glass, but the present invention is applicable to other glazing materials such as acrylic and other plastic transparent or semi-transparent materials. Also, the assembly may comprise three or more glass sheets without departing from the spirit of the present invention.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
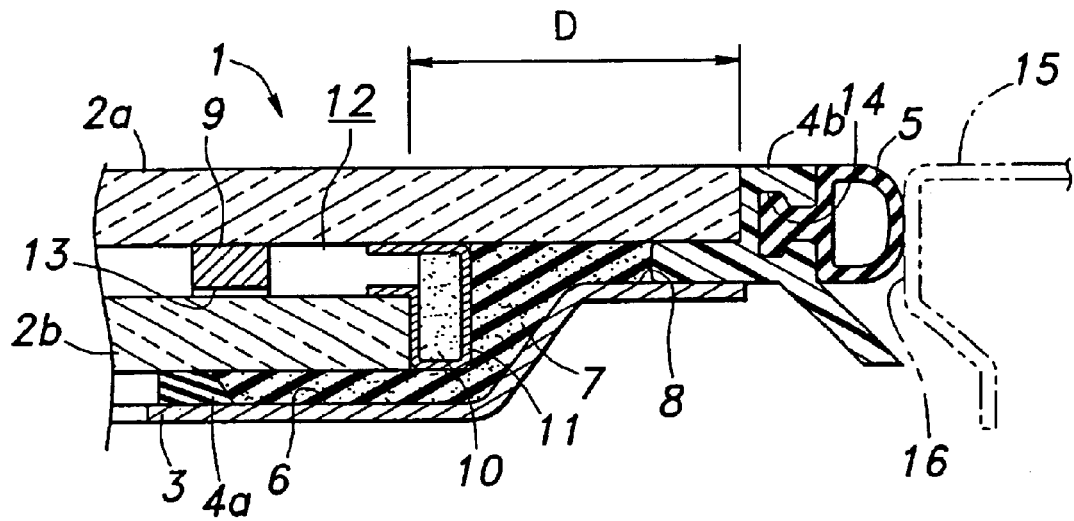
FIG. 1 is a fragmentary sectional side view of a first embodiment of the present invention.

FIG. 1 shows a slide panel assembly for a sun roof system of a motor vehicle embodying the present invention. The slide panel assembly 1 comprises a pair of glass sheets 2a and 2b, and a glass holder frame 3. The glass holder frame 3 is made by stamp forming a metallic plate, and is provided with a rectangular annular shape. The cross section of the glass holder frame substantially defines the shape of letter S or otherwise stepped shape. In other words, the glass holder frame 3 comprises an inner glass supporting surface 6 along an inner peripheral part thereof and an outer glass supporting surface 8 which is somewhat raised as compared to the inner glass supporting surface 6 along an outer peripheral part thereof. These two surfaces 6 and 8 are connected by an inclined, substanlially straight section as seen in the cross section. The glass sheets 2a and 2b are both provided with a rectangular shape substantially conforming to sections of the glass holder frame 3, but the outer edge of the outer glass sheet 2a extends beyond the outer edge of the inner glass sheet 2b by a distance D.

The peripheral part of the inner glass sheet 2b is placed on the inner glass supporting surface 6 via an inner annular mold member 4a made of elastomeric material and extends along the entire inner periphery of the inner glass supporting surface 6 of the glass holder frame 3. Similarly, the peripheral part of the outer glass sheet 2a is placed on the outer glass supporting surface 8 via an outer annular mold member 4b made of elastomeric material and extends along the entire outer periphery of the outer glass supporting surface 8 of the glass holder frame 3. The mold members 4a and 4b are typically insert molded onto the corresponding glass sheets 2a and 2b, but may also be insert molded onto the glass holder frame 3.

Between the outer glass sheet 2a and inner glass sheet 2b is interposed an annular spacer 9 which extends over the entire periphery of the two glass sheets 2a and 2b. Thus, the outer glass sheet 2a and inner glass sheet 2b oppose each other with a certain space 12 defined therebetween by the annular spacer 9. This space 12 may be filled with air, argon, krypton or other gases.

A channel member 11 made of plastic material extends along the outer periphery of the inner glass sheet 2b with an open end thereof facing the interior of the space 12 between the two glass sheets 2a and 2b. The channel member 11 receives a desiccant agent 10 therein to keep the air or gas trapped in the space 12 dry at all time. The annular spacer 9 is provided with a communication groove 13 to ensure the air or gas in the air space 12 to be in contact with the desiccant agent 10.

A sealant or bonding agent 7 is filled into the annular cavity defined by the two glass sheets 2a and 2b, the channel member 11 and the mold members 4a and 4b to seal off the air space from the atmosphere while providing a bonding force for attaching the two glass sheets 2a and 2b to the glass holder frame 6. Thus, the bonding agent 7 attaches the peripheral parts of the inner sides of the two glass sheets 2a and 2b to the glass holder frame 3 over relatively large areas, and provides a strong bonding force for attaching both the inner and outer glass sheets 2a and 2b to the glass holder frame 3.

The outer mold member 4b is formed integrally with the outer periphery of the outer glass sheet 2a by insert molding elastomeric material onto the outer glass sheet 2a. The end surface of the outer mold member 4b facing outward is formed with a groove 14 for retaining a weather strip 5 which engages the inner circumference surface of an opening 16 provided in a fixed roof 15 of the vehicle body to prevent the intrusion of moisture into the passenger compartment.

The glass holder frame 3 is fitted with slide shoes that engage guide rails (not shown in the drawing) attached to the fixed roof 15 and a cam or linkage mechanism for enabling the slide panel to tilt and slide as required. However, these components may be based on conventional arrangements, and are not described in any detail.

Thus, according to the illustrated embodiment, because both the inner and outer glass sheets are directly attached to a metallic frame, the glass panel assembly can be given with a high level of mechanical rigidity and a high level of mechanical strength although the outer glass sheet is not clamped from outside and provides a flush outer surface.

Figure 2:
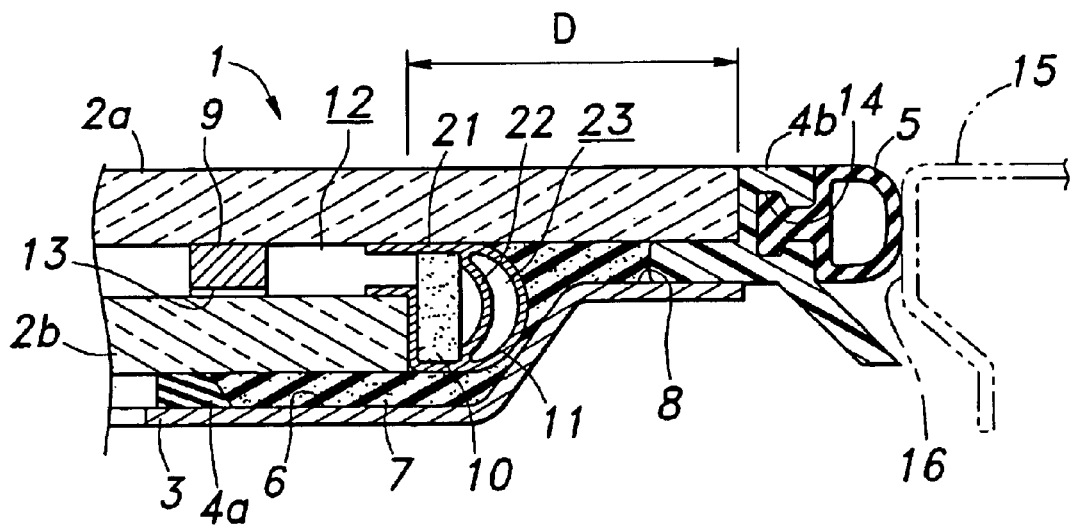
FIG. 2 is a fragmentary sectional side view of a second embodiment of the present invention.

FIG. 2 shows a second embodiment of the present invention which is provided with an arrangement for minimizing the difference between the inner pressure in the air space 12 between the two glass sheets and the ambient pressure. This embodiment is otherwise similar to the first embodiment, and the parts corresponding to those of FIG. 1 are denoted with like numerals in FIG. 2 without repeating the detailed description of such parts.

In this embodiment, an annular chamber 23 is defined in a bottom area of the channel member 11 by a relatively resilient partition wall member 22. The annular chamber 23 communicates with the atmosphere via a small hole (not shown in the drawing). The partition wall 22 keeps the interior of the space 12 (including the desiccant agent 10) defined between the two glass sheets 2a and 2b separated from the atmosphere.

Owing to this arrangement, the difference between the inner pressure of the space 12 and the atmospheric pressure is minimized. When the inner pressure rises as compared to the atmospheric pressure because of thermal expansion of the air in the space 12 or a decrease in the atmospheric pressure (as a result of a higher elevation or a meteorologically created pressure drop), because the annular chamber 23 is communicated with the atmosphere, the partition wall 22 is pushed outward, and this increases the entire volume of the air space 12. This in turn lowers the inner pressure of the air space 12, and minimizes the difference between the inner pressure and atmospheric pressure.

Conversely, when the inner pressure falls as compared to the atmospheric pressure because of thermal contraction of the air in the gap or an increase in the atmospheric pressure (as a result of a lower elevation or a meteorologically created pressure rise), because the annular chamber 23 is communicated with the atmosphere, the partition wall 22 is pushed inward, and this decreases the entire volume of the air space 12. This in turn raises the inner pressure of the space 12, and minimizes the difference between the inner pressure and atmospheric pressure.

Thus, according to this embodiment, even when the panel assembly is subjected to repeated cycles of pressure and/or temperature, the difference between the inner pressure of the air space and atmospheric pressure is minimized, and the distortion of the glass sheets is favorably controlled. Therefore, adverse effects on the bonding agent or other parts responsible for the sealing of the air gap between the two glass sheets are minimized, and the sealing of the air space can be ensured even under extreme conditions.

Although the present invention has been described in terms of preferred embodiments thereof, it is obvious to a person skilled in the art that various alterations and modifications are possible without departing from the scope of the present invention which is set forth in the appended claims.

What is claimed is:

1. A glass panel assembly, comprising:

a glass holder frame defining an inner annular glass supporting surface and an outer annular glass supporting surface which extends along an outer periphery of said inner annular glass supporting surface in a laterally outwardly spaced relationship in a non-overlapping relationship and is raised relative to said inner annular glass supporting surface;

an inner glass sheet having a peripheral part supported by and attached to said inner annular glass supporting surface; and an outer glass sheet having a peripheral part supported by and attached to said outer annular glass supporting surface, wherein said panel assembly is adapted to be an automotive sun roof slide panel.

2. A glass panel assembly according to claim 1, wherein said glass holder frame comprises a metallic frame member, and said peripheral part of at least one of said glass sheets is supported by the corresponding annular glass supporting surface via an elastomeric annular mold member insert molded onto said metallic frame member or the corresponding glass sheet.

3. A glass panel assembly according to claim 2, wherein a bonding agent is filled in an annular space defined between said peripheral part of said at least one of said glass sheets and the corresponding annular glass supporting surface, said elastomeric annular mold member providing a peripheral damn for said bonding agent.

4. A glass panel assembly according to claim 1, wherein said glass holder frame comprises a metallic frame member, and said peripheral part of each of said glass sheets is supported by the corresponding annular glass supporting surface via an elastomeric annular mold member insert molded onto said metallic frame member or the corresponding glass sheet.

5. A glass panel assembly according to claim 4, wherein an annular member is disposed along an outer peripheral part of said inner glass sheet so as to define a space defined between said two glass sheets, and a bonding agent is filled in an annular space defined between said peripheral parts of said glass sheets, said annular member, said glass support frame and said elastomeric annular mold members.

6. A glass panel assembly according to claim 4, wherein said elastomeric annular mold member corresponding to said outer annular glass supporting surface retains a weather strip.

7. A glass panel assembly according to claim 1, wherein a resilient wall member extends along a peripheral part of a space defined between said glass sheets, and defines a substantially enclosed inner chamber separated from said space and communicating with the atmosphere.

8. A glass panel assembly according to claim 1, wherein said outer glass sheet and said outer annular glass supporting surface jointly define a flush otter surface.

9. A glass panel assembly, comprising:

a glass holder frame defining an inner annular glass supporting surface and an outer annular glass supporting surface which extends alone an outer periphery of said inner annular glass supporting surface in a laterally outwardly spaced relationship in a non-overlapping relationship and is raised relative to said inner annular glass supporting surface;

an inner glass sheet having a peripheral part supported by and attached to said inner annular glass relationship surface; and an outer glass sheet having a peripheral part supported by and attached to said outer annular glass supporting surface, wherein a spacer member is interposed between said glass sheets.

10. A glass panel assembly comprising:

a glass holder frame defining an inner annular glass supporting surface and an outer annular glass supporting surface which extends along an outer periphery of said inner annular glass supporting surface in a laterally outwardly spaced relationship in a non-overlapping relationship, and is raised relative to said inner annular glass supporting surface;

an inner glass sheet having a peripheral part supported by end attached to said inner annular glass supporting surface; and an outer glass sheet having a peripheral part supported by and attached to said outer annular glass supporting surface, wherein a channel member receiving a desiccant extends along a peripheral part of a space defined between said glass sheets.

11. A glass panel assembly according to claim 10, wherein said glass holder frame comprises a metallic frame member, and said peripheral part of each of said glass sheets is supported by the corresponding annular glass supporting surface via an elastomeric mold member insert molded onto said metallic frame member or the corresponding glass sheet, a bonding agent being filled in an annular space defined between said peripheral parts of said glass sheets, said channel member, said glass support frame and said mold members.

12. A glass panel assembly according to claim 10, wherein said channel member is provided with a resilient internal wall defining an annular chamber in a bottom region of said channel member, said annular chamber being separated from said space defined between said glass sheets and communicated with the atmosphere.

* * * * *